United States Patent
Roev et al.

(10) Patent No.: US 9,054,383 B2
(45) Date of Patent: *Jun. 9, 2015

(54) POROUS CARBONACEOUS COMPOSITE MATERIAL, POSITIVE ELECTRODE AND LITHIUM AIR BATTERY INCLUDING THE MATERIAL, AND METHOD OF PREPARING THE MATERIAL

(75) Inventors: Victor Roev, Suwon-si (KR); Dong-min Im, Seoul (KR); Anass Benayad, Yongin-si (KR)

(73) Assignee: SAMSUNG ELECTRONICS CO., LTD. (KR)

(*) Notice: Subject to any disclaimer, the term of this patent is extended or adjusted under 35 U.S.C. 154(b) by 28 days.

This patent is subject to a terminal disclaimer.

(21) Appl. No.: 13/606,950

(22) Filed: Sep. 7, 2012

(65) Prior Publication Data

US 2013/0183592 A1  Jul. 18, 2013

(30) Foreign Application Priority Data

Jan. 18, 2012  (KR) .................. 10-2012-0005840

(51) Int. Cl.
*H01M 8/22* (2006.01)
*H01M 4/86* (2006.01)
*H01M 4/40* (2006.01)
(Continued)

(52) U.S. Cl.
CPC .............. *H01M 4/8605* (2013.01); *Y02E 60/50* (2013.01); *H01M 4/381* (2013.01); *H01M 4/405* (2013.01); *H01M 4/46* (2013.01); *H01M 4/8668* (2013.01); *H01M 4/8828* (2013.01); *H01M 4/9008* (2013.01); *H01M 4/9016* (2013.01); *H01M 4/9041* (2013.01); *H01M 4/92* (2013.01);
(Continued)

(58) Field of Classification Search
CPC ....... H01M 4/405; H01M 4/96; H01M 4/381; H01M 4/46; H01M 4/387; H01M 4/92; H01M 4/923; H01M 4/8668
USPC ........................................ 429/405
See application file for complete search history.

(56) References Cited

U.S. PATENT DOCUMENTS

| 5,773,167 A | 6/1998 | Iwasaki et al. |
| 6,156,457 A | 12/2000 | Takami et al. |

(Continued)

FOREIGN PATENT DOCUMENTS

| EP | 2174910 A1 | 4/2010 |
| JP | 9-293511 | 11/1997 |

(Continued)

OTHER PUBLICATIONS

Yongliang Li, et al, *Nitrogen-doped carbon nanotubes as cathode for lithium-air batteries*, Electrochemistry Communications 13 (2011), pp. 668-672, Available online Apr. 12, 2011.
Extended European Search Report for Application No. 12192167.0-1360 dated Apr. 12, 2013.

(Continued)

*Primary Examiner* — Nicholas P D'Aniello
(74) *Attorney, Agent, or Firm* — Cantor Colburn LLP (57) ABSTRACT

A porous carbonaceous composite material, a positive electrode and lithium air battery including the porous carbonaceous composite material, and a method of preparing the porous carbonaceous composite material. The porous carbonaceous composite material includes a carbon nanotube (CNT); and a modified carbonaceous material doped with a heterogeneous element, wherein the ratio of the number of surface oxygen atoms to the number of surface carbon atoms ranges upward from about 2 atom %.

29 Claims, 2 Drawing Sheets (51) Int. Cl.
*H01M 4/96* (2006.01)
*H01M 4/38* (2006.01)
*H01M 4/46* (2006.01)
*H01M 4/88* (2006.01)
*H01M 4/90* (2006.01)
*H01M 4/92* (2006.01)

(52) U.S. Cl.
CPC .............. *H01M4/923* (2013.01); *H01M 4/96* (2013.01); *H01M 4/387* (2013.01)

(56) References Cited

U.S. PATENT DOCUMENTS

| | | |
|---|---|---|
| 7,794,683 B1 | 9/2010 | Forohar et al. |
| 2004/0223900 A1 | 11/2004 | Khabashesku et al. |
| 2009/0053594 A1 | 2/2009 | Johnson et al. |
| 2010/0203391 A1* | 8/2010 | Lopatin et al. ............. 429/231.8 |
| 2011/0206932 A1* | 8/2011 | Waki et al. .................. 428/400 |

FOREIGN PATENT DOCUMENTS

| | | |
|---|---|---|
| JP | 11-67207 | 3/1999 |
| JP | 2000-268888 | 9/2000 |
| JP | 2001-273935 | 10/2001 |
| KR | 1998-080096 | 11/1998 |
| KR | 10-2009-0020521 | 2/2009 |
| KR | 1020120047602 A | 5/2012 |
| KR | 1020130014650 A | 2/2013 |

OTHER PUBLICATIONS

Kwon, T, et al, "Enhancement Mechanism of Electrochemical Capacitance in Nitrogen-Boron-Doped Carbons with Uniform Straight Nanochannels" Langmuir, vol. 25, No. 19, Oct. 6, 2009 pp. 11961-11968.
Singh, P, et al, "Organic functionalisation and characterisation of single-walled carbon nanotubes", Chem. Soc. Rev., (2009), 38, pp. 2214-2230.
Cao, Y, et al, "Nitrogen-, phosphorous- and boron-doped carbon nanotubes as catalysts for the aerobic oxidation of cyclohexane" Carbon 57 (2013) pp. 433-442.
Kim, et al., "Synthesis and high electrochemical capacitance of N-doped microporous carbon/carbon nanotubes for supercapacitor" Journal of Electroanalytical Chemistry, (2012) 673, pp. 58-64.
Chen, C, et al., "Oxygen Functionalization of Multiwall Carbon Nanotubes by Microwave-Excited Surface-Wave Plasma Treatment", J. Phys. Chem. (2009), 113, pp. 7659-7665.
Kolacyak, D, et al, "Fast Functionalization of multi-walled carbon nanotubes by an atmospheric pressure plasma jet", Journal of Colloid and Interface Science, (2011) 359, pp. 311-317.
S. S. Zhang et al., Heat-treated metal phthalocyanine complex as an oxygen reduction catalyst for non-aqueous electrolyte Li/air batteries, Electrochmica Acta 56 (2011) pp. 4544-4548.
Y. Li et al., Nitrogen-doped carbon nanotubes as cathode fo lithium-air batteries, Electrochemistry Communications 13 (2011) pp. 668-672.
Y-C Lu et al., The Influence of Catalysts on Discharge and Charge Voltages of Rechargeable Li-Oxygen Batteries, Eletrochemical and Solid-State Letters, 13 (6) pp. A69-A72 (2010).

* cited by examiner

POROUS CARBONACEOUS COMPOSITE MATERIAL, POSITIVE ELECTRODE AND LITHIUM AIR BATTERY INCLUDING THE MATERIAL, AND METHOD OF PREPARING THE MATERIAL

CROSS-REFERENCE TO RELATED APPLICATIONS

This application claims the benefit of Korean Patent Application No. 10-2012-0005840, filed on Jan. 18, 2012, in the Korean Intellectual Property Office, the disclosure of which is incorporated herein in its entirety by reference.

BACKGROUND

1. Field

Aspects of the present invention relate to a porous carbonaceous composite material, a positive electrode and a lithium air battery including the porous carbonaceous composite material, and a method of preparing the porous carbonaceous composite material. More particularly, aspects of the present invention relate to a porous carbonaceous composite material including an oxygen functionalized carbon nanotube (CNT) and a modified carbonaceous material doped with a heterogeneous element and having upward of about 2 atom % of the number of surface oxygen atoms to the number of surface carbon atoms, a positive electrode and a lithium air battery including the porous carbonaceous composite material, and a method of preparing the porous carbonaceous composite material.

2. Description of the Related Art

A lithium air battery generally includes a negative electrode capable of intercalating and deintercalating lithium ions, a positive electrode that oxidizes or reduces oxygen present in the air, and an electrolyte disposed between the negative and positive electrodes.

Since a lithium air battery uses lithium metal as a negative electrode and does not have to store air acting as a positive active material (in detail, oxygen in air) within the battery, the lithium air battery may have high capacity. Lithium air batteries have high theoretical energy densities per unit weight of 3500 Wh/kg or greater, which are about ten times higher than those of lithium ion batteries.

However, because of polarization generated during charging and discharging, existing lithium air batteries have considerably lower energy efficiency compared to lithium ion batteries. To lower the polarization, various kinds of catalysts have been used in the lithium air batteries; however, effects thereof have not been sufficient. For example, "Electrochemistry Communications 13 (2011) 668-672" discloses a lithium air battery including a positive electrode including a carbon nanotube (CNT) doped with nitrogen (N); however, its energy efficiency is also low.

Therefore, there is a demand for methods that further reduce the polarization to obtain higher energy efficiency in a lithium air battery.

SUMMARY

Aspects of the present invention provide a porous carbonaceous composite material including an oxygen functionalized carbon nanotube (CNT) and a modified carbonaceous material doped with a heterogeneous element and having upward of about 2 atom % or more of the number of surface oxygen atoms to the number of surface carbon atoms.

Aspects of the present invention provide a positive electrode including the porous carbonaceous composite materials.

Aspects of the present invention provide a lithium air battery including the positive electrodes.

Aspects of the present invention provide a method of preparing the porous carbonaceous composite material.

According to an aspect of the present invention, a porous carbonaceous composite material includes an oxygen functionalized carbon nanotube (CNT); and a modified carbonaceous material doped with a heterogeneous element, wherein the ratio of the number of surface oxygen atoms to the number of surface carbon atoms ranges from about 2 to about 15 atom %.

According to another aspect of the present invention, a positive electrode includes the porous carbonaceous composite material; and a binder, wherein oxygen is used as a positive active material.

According to another aspect of the present invention, a lithium air battery includes a negative electrode capable of intercalating and deintercalating lithium; the positive electrode; and an electrolyte filled between the negative electrode and the positive electrode.

According to another aspect of the present invention, a method of preparing a porous carbonaceous composite material includes preparing a first mixture by mixing a carbon nanotube (CNT), oxygen-containing organic acid, and an organic solvent; preparing an oxygen functionalized CNT by drying the first mixture; preparing a second mixture by mixing the oxygen functionalized CNT and a carbon precursor including a heterogeneous element; and sintering the second mixture.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, a porous carbonaceous composite material, a positive electrode and lithium air battery including the porous carbonaceous composite material, and a method of preparing the porous carbonaceous composite material will be described with regard to exemplary embodiments of the invention with reference to the attached drawings. As used herein, the term "and/or" includes any and all combinations of one or more of the associated listed items.

A porous carbonaceous composite material according to an embodiment of the present invention includes oxygen functionalized carbon nanotube (CNT), and a modified carbonaceous material doped with a heterogeneous element, wherein the ratio of the number of surface oxygen atoms to the number of surface carbon atoms ranges from about 2 to about 15 atom %. The porous carbonaceous composite material includes a composite of the oxygen functionalized CNT and the modified carbonaceous material. As used herein, the term "oxygen functionalized CNT" refers to a CNT having a functional group including oxygen on a surface thereof. As used herein, the term "composite" refers to a material that is prepared from two or more materials having different physical and/or chemical properties, which are macroscopically or microscopically differentiated in a finished structure. In addition, as used herein, the term "heterogeneous element" refers to an element other than carbon.

A lithium air battery may use either an aqueous electrolyte or an organic electrolyte as an electrolyte. A reaction mechanism of a lithium air battery using an organic electrolyte may be given by Reaction Scheme 1 below.

Reaction Scheme 1

During discharging, an oxygen reduction reaction (ORR) occurs on a positive electrode. That is, oxygen in the air and lithium originated from a negative electrode meet on a positive electrode and react thereon so that the oxygen is reduced and lithium oxide is formed. Conversely, during charging, an oxygen evolution reaction (OER) occurs on a positive electrode. That is, the lithium oxide is reduced on a positive electrode to produce oxygen.

During discharging, lithium peroxide ($Li_2O_2$) is deposited in pores of the positive electrode, and the extent of filling the pores with the deposited $Li_2O_2$ determines the capacity of the lithium air battery. However, the deposited $Li_2O_2$ is difficult to reduce during charging. Accordingly, during charging, an overvoltage is applied thereto to facilitate reduction of the deposited $Li_2O_2$. Generally, a catalytic material is added into the positive electrode to lower the overvoltage.

The porous carbonaceous composite material may lower the overvoltage without adding a separate catalytic material. That is, the heterogeneous element contained in the modified carbonaceous material may serve as a catalyst and thus lower the overvoltage during charging and discharging. Thus, the porous carbonaceous composite material may act as a catalyst and a catalyst support at the positive electrode of the lithium air battery.

When the ratio of the number of surface oxygen atoms to the number of surface carbon atoms ranges from about 2 to about 15 atom %, the affinity between an electrolyte and a positive electrode including the porous carbonaceous composite material is increased to accelerate a charge reaction, thereby reducing polarization. When the ratio of the number of surface oxygen atoms to the number of surface carbon atoms of the porous carbonaceous composite material is greater than 15 atom %, the affinity between the positive electrode and the electrolyte is further increased, but the electronic conductivity of the surface of the porous carbonaceous composite material is reduced. Thus, it is not appropriate to use the porous carbonaceous composite material as a catalyst and/or a catalyst support. As used herein, the term 'polarization' refers to a difference between an average charging voltage and an average discharging voltage.

Hereinafter, an exemplary mechanism by which the porous carbonaceous composite material increases energy efficiency of the lithium air battery is described in detail. The description is for illustrative purposes only and is not intended to limit the scope of the present disclosure.

The oxygen functionalized CNT of the porous carbonaceous composite material has high electrical conductivity and high affinity to electrolyte. Thus, it is very easy to transfer electrons from an active site of the modified carbonaceous material where oxygen oxidation and reduction reactions occur to a current collector via the oxygen functionalized CNT. In addition, it is easy to transfer oxygen and an electrolyte to the active site through pores formed in the oxygen functionalized CNT and between a plurality of the oxygen functionalized CNTs. Thus, since oxygen supply and electron transfer are easily performed, reversibility of oxygen oxidation and reduction reactions may be increased. As a result, the energy efficiency of the lithium air battery may be increased.

The porous carbonaceous composite material may include a core including the oxygen functionalized CNT, and a coating layer disposed to cover at least one portion of the core, wherein the coating layer may include the modified carbonaceous material doped with the heterogeneous element. The shape of the coating layer is not particularly limited. The coating layer may have various shapes, such as uniform or non-uniform shapes. For example, the coating layer may be formed to protrude from a surface of the oxygen functionalized CNT. The non-uniform coating layer may increase the contact area with an electrolyte.

In addition, the core may include a plurality of the oxygen functionalized CNTs and pores existing therebetween. That is, the core may have a porous structure including the plurality of oxygen functionalized CNTs and the pores existing therebetween. A coating layer formed on the oxygen functionalized CNT may bind the plurality of oxygen functionalized CNTs to each other. An electrolyte may smoothly move through the pores existing between the plurality of oxygen functionalized CNTs.

The modified carbonaceous material may include an oxygen-containing functional group, like the oxygen functionalized CNT.

The modified carbonaceous material may include, but is not limited to, at least one selected from the group consisting of a carbon nanoparticle, mesoporous carbon, a CNT, a carbon nanofiber, a carbon nanosheet, a carbon nanorod, and a carbon nanobelt. Any carbonaceous material available in the art may be used as long as the carbonaceous material is doped with a heterogeneous element and has electrical conductivity.

For example, the modified carbonaceous material may be a modified carbon nanoparticle. That is, the coating layer may be one formed of an agglomerate of the modified carbonaceous material doped with the heterogeneous element.

The average diameter of the carbon nanoparticle may be in a range of about 2 nm to about 900 nm. When the average diameter of the carbon nanoparticles is within this range, the energy efficiency of the lithium air battery may be further increased. For example, the average diameter of the carbon nanoparticles may be in a range of about 2 nm to about 30 nm.

The modified carbonaceous material may be a sintered material of a carbon precursor including the heterogeneous elements. That is, the carbon nanoparticle doped with the heterogeneous element may be obtained by sintering the carbon precursor including the heterogeneous element.

The heterogeneous element may include at least one element selected from the group consisting of Groups 13 to 16 of the periodic table. For example, the heterogeneous element may include, but is not limited to, at least one element selected from the group consisting of nitrogen (N), sulfur (S), phosphorus (P), selenium (Se), tellurium (Te), and boron (B). The heterogeneous element may be any heterogeneous element that facilitates oxidation/reduction reaction of oxygen.

The ratio of the number of the heterogeneous elements (i.e., atoms) doped into the coating layer to the total number of atoms contained in the coating layer may be 30 atom % or less. When the ratio of the number of the heterogeneous elements doped on the coating layer to the total number of atoms contained in the coating layer is within the above range, energy efficiency of a lithium air battery may be further increased. The ratio of the number of the heterogeneous elements doped on the coating layer to the total number of atoms contained in the coating layer may be obtained as a percentage of the peak area of heterogeneous elements to the total peak area of heterogeneous elements and carbon elements in an X-ray photoelectron spectroscopy (XPS) spectrum of the coating layer. For example, the ratio of the number of the heterogeneous elements doped on the coating layer to the total number of atoms contained in the coating layer may be in a range of about 0.01 atom % to about 30 atom %.

The oxygen functionalized CNT may include at least one selected from the group consisting of a single-walled oxygen functionalized CNT, a double-walled oxygen functionalized CNT, and a multi-walled oxygen functionalized CNT. In addition, the oxygen functionalized CNT may include at least one selected from the group consisting of a semiconducting oxygen functionalized CNT and a metallic oxygen functionalized CNT.

The average pore size (4V/A) of the porous carbonaceous composite material as a value measured by using the Brunauer-Emmett-Teller (BET) method may be in the range of about 1 nm to about 200 nm. When the average pore size of the porous carbonaceous composite material is within the above range, sufficient space for storing lithium oxide such as lithium peroxide ($Li_2O_2$) that is a product formed during charging may be obtained in the porous carbonaceous composite material and the surface area of the porous carbonaceous composite material may be increased, thereby increasing the electrochemical activity of the porous carbonaceous composite material.

The specific surface area of the porous carbonaceous composite material as a value measured by using the BET method may be in the range of about 100 $m^2/g$ to about 900 $m^2/g$. When the specific surface area of the porous carbonaceous composite material as a value measured by using the BET method is within the above range, the electrochemical activity of the porous carbonaceous composite material may be maintained high.

According to another embodiment of the present invention, a positive electrode may include the above-described porous carbonaceous composite material, and a binder, wherein oxygen is used as a positive active material. The positive electrode includes the porous carbonaceous composite material, thereby lowering polarization during charging and discharging of the lithium air battery.

The average pore size of the positive electrode as a value measured by using the BET may be in the range of about 10 nm to about 200 nm. When the average pore size of the positive electrode as a value measured by using the BET method is within the above range, sufficient space for storing lithium oxide such as lithium peroxide ($Li_2O_2$) that is a product formed during charging may be obtained in the positive electrode and the surface area of the positive electrode may increase, thereby increasing the electrochemical activity of the positive electrode.

The specific surface area of the positive electrode as a value measured by using the BET method may be in the range of about 30 $m^2/g$ to about 900 $m^2/g$. When the specific surface area of the positive electrode is within the above range, the electrochemical activity of the positive electrode may be maintained high.

The positive electrode may further include a catalyst that facilitates oxygen oxidation and reduction.

For example, the catalyst may include at least one material selected from the group consisting of a metal particle, a metal oxide particle, and an organometallic compound.

The metal particle may include, but is not limited to, at least one metal selected from the group consisting of cobalt (Co), nickel (Ni), iron (Fe), gold (Au), silver (Ag), platinum (Pt), ruthenium (Ru), rhodium (Rh), osmium (Os), iridium (Ir), palladium (Pd), copper (Cu), manganese (Mn), titanium (Ti), vanadium (V), tungsten (W), molybdenum (Mo), and niobium (Nb), and an alloy including at least two of the foregoing.

The metal oxide particle may include, but is not limited to, at least one particle selected from the group consisting of manganese oxide, cobalt oxide, iron oxide, zinc oxide, nickel oxide, vanadium oxide, molybdenum oxide, niobium oxide, titanium oxide, tungsten oxide, chromium oxide, and a composite oxide thereof.

The organometallic compound may include, but is not limited to, an aromatic heterocyclic compound that is coordinated to a transition metal. The organometallic compound may be any organometallic compound that can be used as oxygen oxidation and reduction catalyst and is available in the art.

For example, the catalyst may include tungsten carbide (WC), WC fused cobalt, $CoWO_4$, $FeWO_4$, NiS, $WS_2$, $La_2O$, $Ag_2O$, cobalt phthalocyanine, and mixtures including at least one of the foregoing.

An example of manufacturing of the positive electrode is as follows.

The porous carbonaceous composite material and a binder may be mixed, and then an appropriate solvent may be added to the mixture to prepare a positive electrode slurry. The positive electrode slurry may be coated on a surface of a current collector and dried to obtain a positive electrode. Optionally, a mixture of the porous carbonaceous composite material and a binder may be press-molded onto a current collector to obtain a positive electrode.

The binder may include a thermoplastic resin and/or a thermosetting resin. Examples of the binder include, but are not limited to, polyethylene, polypropylene, polytetrafluoroethylene (PTFE), polyvinylidene fluoride (PVdF), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a fluorovinylidene-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoro ethylene copolymer, and an ethylene-acrylic acid copolymer, and these examples may be used alone or in a combination including at least two of the foregoing. Any appropriate binder available in the art may be used.

A porous body in a matrix or mesh form may be used as the current collector to facilitate diffusion of oxygen. For example, a porous metal plate made of stainless steel, nickel, or aluminum, or a porous membrane made of carbon may be used. Materials for the current collector are not particularly limited, and any appropriate material for current collectors available in the art may be used. The current collector may be coated with an oxidation resistant metal or alloy to prevent oxidation.

The positive electrode slurry may further include the above-described catalyst and a conductive material. In addition, the positive electrode slurry may further include lithium oxide.

Any material may be used for the conductive material without limitation as long as it has porosity and electrical conductivity. For example, porous carbonaceous materials may be used. Examples of a carbonaceous material are carbon blacks, graphites, graphenes, activated carbons, carbon fibers, and combinations thereof. Conductive materials, including metal fibers and metal meshes, may be used. The conductive materials may include metal powders of copper, silver, nickel, aluminum, and the like. Organic conductive materials, such as polyphenylene derivatives, may be used. The above-listed conductive materials may be used alone or in a combination including at least two of the foregoing.

According to another embodiment of the present invention, a lithium air battery includes a negative electrode capable of intercalating and deintercalating lithium ions, the above-described positive electrode, and an electrolyte disposed between the negative and positive electrodes.

In some embodiments, the negative electrode capable of intercalating and deintercalating lithium ions of the lithium air battery may include lithium metal, a lithium metal-based alloy, or other materials capable of intercalating and deintercalating lithium ions. Materials for the negative electrode are not particularly limited to these materials. The negative electrode determines the capacity of the lithium air battery. Examples of the lithium-based alloy include alloys of Li with aluminum (Al), tin (Sn), magnesium (Mg), indium (In), calcium (Ca), germanium (Ge), antimony (Sb), bismuth (Bi), lead (Pb), and the like.

The electrolyte may be an organic electrolyte or an aqueous electrolyte.

The organic electrolyte of the lithium air battery may include an aprotic solvent. Examples of the aprotic solvent include carbonate-based solvents, ester-based solvents, ether-based solvents, ketone-based solvents, amine-based solvents, and phosphine-based solvents.

Examples of the carbonate-based solvents include dimethyl carbonate (DMC), diethyl carbonate (DEC), ethylmethyl carbonate (methylethyl carbonate, EMC or MEC), dipropyl carbonate (DPC), methyl propyl carbonate (MPC), ethylpropyl carbonate (EPC), ethylene carbonate (EC), propylene carbonate (PC), and butylene carbonate (BC).

Examples of the ester-based solvents include methyl acetate, ethyl acetate, n-propyl acetate, t-butyl acetate, methyl propionate, ethyl propionate, γ-butyrolactone, decanolide, valerolactone, mevalonolactone, and caprolactone.

Examples of the ether-based solvents include dibutyl ether, tetraglyme, triglyme, diglyme, dimethoxyethane, 2-methyltetrahydrofuran, tetrahydrofuran, and 1,3-dioxolane.

An example of the ketone-based solvents may be cyclohexanone.

Examples of the amine-based solvents include triethylamine and triphenylamine.

An example of the phosphine-based solvents includes triethylphosphine. However, the present invention is not limited to the above-described examples.

Examples of the aprotic solvent include nitriles such as R—CN (wherein R is a $C_2$-$C_{20}$ linear, branched, or cyclic hydrocarbon group, and may include a double-bonded aromatic ring or an ether bond), amides such as dimethylformamide, dioxolanes such as 1,3-dioxolane, and sulfolanes.

The aprotic solvent may be used alone or in a combination of at least two.

The organic electrolyte may include an ionic liquid. Examples of the ionic liquid include linear or branched, substituted or unsubstituted compounds containing cations such as ammonium, imidazolium, pyrrolidinium, and piperidinium, and anions such as $PF_6^-$, $BF_4^-$, $CF_3SO_3^-$, $(CF_3SO_2)_2N^-$, $(C_2F_6SO_2)_2N^-$, and $(CN)_2N^-$.

The organic electrolyte may include at least one of an alkali metal salt and/or an alkali earth metal salt. The alkali metal salt and/or the alkali earth metal salt may be dissolved in an organic solvent to form a solution. The solution may act as a source of at least one of alkali metal ions and alkali earth metal ions in the lithium air battery. The salt may facilitate migration of the alkali metal ions and/or alkali earth metal ions between the positive and negative electrodes.

For example, cations of the alkali metal salt and/or alkali earth metal salt may include lithium ions, sodium ions, magnesium ions, potassium ions, calcium ions, rubidium ions, strontium ions, cesium ions, barium ions, and the like.

Anions of the alkali metal salt and/or alkali earth metal salt in the organic electrolyte may include at least one kind of ions selected from the group consisting of $PF_6^-$, $BF_4^-$, $SbF_6^-$, $AsF_6^-$, $C_4F_9SO_3^-$, $ClO_4^-$, $AlO_2^-$, $AlCl_4^-$, $C_xF_{2x+1}SO_3^-$ (where x is a natural number), $(C_xF_{2x+1}SO_2)(C_yF_{2y+1}SO_2)N^-$ (where x and y are natural numbers), and halide.

The alkali metal salt and/or the alkali earth metal salt may include, but are not limited to, one or two selected from the group consisting of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$(where x and y are natural numbers), LiF, LiBr, LiCl, LiI, and $LiB(C_2O_4)_2$ (LiBOB; lithium bis(oxalato) borate).

In the organic electrolyte, the amount of the alkali metal salt and/or the alkali earth metal salt may be from about 100 mM to about 10 M, and in some embodiments, may be from about 500 mM to about 2 M. The amount of the salt is not particularly limited, as long as the organic electrolyte may effectively transfer lithium ions and/or electrons during charging and discharging.

In addition, a separator may be disposed between the negative electrode and the positive electrode. The separator may include any appropriate material durable in environments in which the lithium air battery is used. For example, the separator may be formed of a polymer non-woven fabric, such as a polypropylene non-woven fabric or a polyphenylene sulfide non-woven fabric, a porous film of olefin-based resin such as polyethylene or polypropylene, or a combination of at least two of these materials.

A lithium ion conductive solid electrolyte membrane may be additionally disposed between the negative electrode and the organic electrolyte. The lithium ion conductive solid electrolyte membrane may serve as a protective layer preventing impurities such as water contained in an aqueous electrolyte and oxygen from directly reacting with lithium contained in the negative electrode. Examples of the lithium ion conductive solid electrolyte membrane may include an inorganic material, but are not limited to, lithium ion conductive glass, lithium-ion conductive crystal (ceramic or glass-ceramic), or a mixture thereof. To attain chemical stability, the lithium ion conductive solid electrolyte membrane may include an oxide.

The lithium ion conductive glass-ceramic may be $Li_{1+x+y}(Al, Ga)_x(Ti, Ge)_{2-x}Si_yP_{3-y}O_{12}$ (where $0 \leq x \leq 1$, $0 \leq y \leq 1$, and in some embodiments, $0 \leq x \leq 0.4$, $0 \leq y \leq 0.6$, and in some embodiments, $0.1 \leq x \leq 0.3$, and $0.1 \leq y \leq 0.4$). Examples of the lithium ion conductive ceramic include lithium-aluminum-germanium-phosphate (LAGP), lithium-aluminum-titanium-phosphate (LATP), lithium-aluminum-titanium-silicon-phosphate (LATSP), and a combination thereof.

The lithium ion conductive solid electrolyte membrane may further include a polymer solid electrolyte, in addition to the glass-ceramic. The polymer solid electrolyte may be polyethylene oxide doped with a lithium salt. Examples of the lithium salt include $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_6)_2$, $LiC(SO_2CF_3)_3$, $LiN(SO_3CF_3)_2$, $LiC_4F_9SO_3$, $LiAlCl_4$, and a combination thereof.

The lithium ion conductive solid electrolyte membrane may further include an inorganic solid electrolyte, in addition to the glass-ceramic. Examples of the inorganic solid electrolyte include $Cu_3N$, $Li_3N$, LiPON, and a combination thereof.

An example of manufacturing of the lithium air battery is as follows. First, a positive electrode, including the porous carbonaceous composite material, a negative electrode capable of intercalating and deintercalating lithium ions, and a separator, are prepared.

Next, the negative electrode is disposed in one side of a case, and the positive electrode equipped with the separator is disposed in a side of the case opposite to the negative electrode, wherein the separator is disposed on a side of the positive electrode facing the negative electrode. An electrolyte is injected between the positive electrode and the negative electrode, a porous current collector is disposed on the positive electrode, a pressing member is disposed on the porous current collector, and the porous current collector is pressed with the pressing member to fix a cell, thereby completing the manufacturing of the lithium air battery. In this case, the pressing member may act as a path that allows air to reach the positive electrode. A lithium ion conductive solid electrolyte membrane may be further disposed on one surface of the negative electrode.

The case may be divided into upper and lower parts that contact the negative and positive electrodes, respectively. An insulating resin may be disposed between the upper and lower parts to electrically separate the positive and negative electrodes from each other.

The lithium air battery may be either a lithium primary battery or a lithium secondary battery. The lithium air battery may have any of various shapes, and in some embodiments, may have a coin, button, sheet, stack, cylinder, plane, or horn shape. The lithium air battery may be used as a large-scale battery for electric vehicles.

Figure 1:
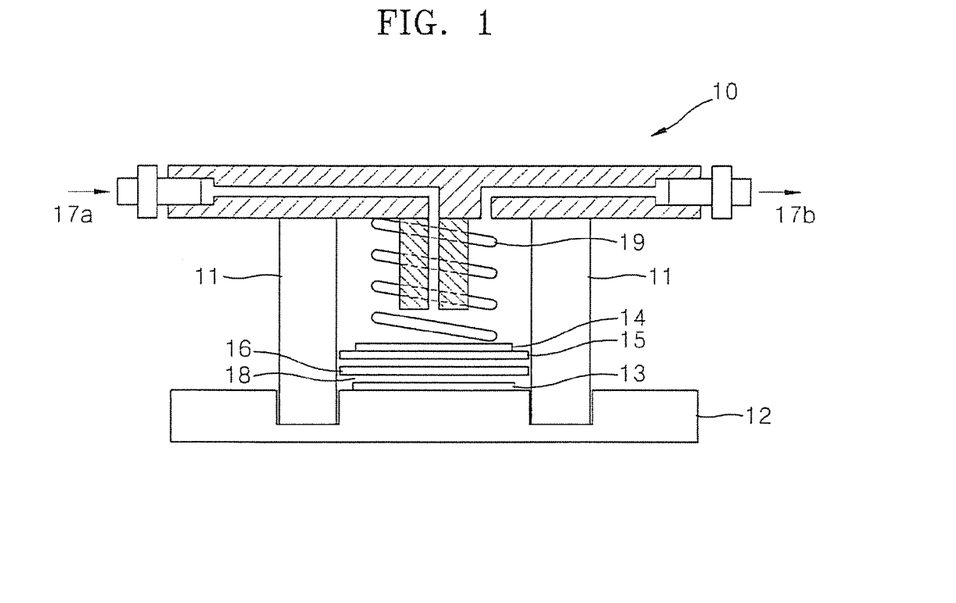
FIG. 1 is a schematic view of a lithium air battery according to an embodiment of the present invention.

FIG. 1 is a schematic view of a lithium air battery 10 according to an embodiment of the present invention. Referring to FIG. 1, the lithium air battery 10 includes a first current collector 12, a negative electrode 13 adjacent to the first current collector 12 and including lithium, a second current collector 14, a positive electrode 15 formed on the second current collector 14 and using oxygen as an active material, an electrolyte 18 filled between the negative electrode 13 and the positive electrode 15, and a separator 16 disposed on one surface of the positive electrode 15. A lithium ion conductive solid electrolyte membrane (not shown) may be disposed on one surface of the negative electrode 13. The second current collector 14, which is porous, may serve as a gas diffusion layer through which air may diffuse. A pressing member 19 allowing air to reach the positive electrode 15 is disposed on the second current collector 14. A case 11 made of an insulating resin electrically separates the positive electrode 15 and the negative electrode 13. The air is supplied via an air inlet 17a and is discharged via an air outlet 17b.

As used herein, the term "air" is not limited to atmospheric air, and may refer to a combination of gases including oxygen, or pure oxygen gas.

According to an embodiment of the present invention, a method of preparing the porous carbonaceous composite material includes preparing a first mixture by mixing a CNT, oxygen-containing organic acid, and an organic solvent, preparing an oxygen functionalized CNT by drying the first mixture, preparing a second mixture by mixing the oxygen functionalized CNT and a carbon precursor including a heterogeneous element, and sintering the second mixture.

Examples of the oxygen-containing organic acid may include at least one selected from the group consisting of citric acid, acetic acid, oxalic acid, gluconic acid, ethylenediamine tetra acetic acid (EDTA), diethylenetriamine-N,N,N',N',N"-pentaacetic acid (DTPA), trimethylamine tricarboxylic acid (NTA), and alkali metal salts thereof.

Examples of the organic solvent may include at least one selected from the group consisting of acetone, acetonitrile, ethanol, methanol, isopropanol, N-methylpyrrolidone, and dimethyl sulfoxide.

The first mixture may be prepared by incipient wetness impregnation. As used herein, the term "incipient wetness impregnation" refers to a method of preparing a slurry including a CNT and then filling pores of the CTN with a liquid material by using a capillary phenomenon. For example, the first mixture may be prepared by mixing the CNT and the oxygen-containing organic acid in an organic solvent such as acetone to prepare a slurry, putting the slurry in a container such as a plastic pouch bag, and then repeatedly rubbing down the container with the hands, tools or the like.

The first mixture may be dried for about 1 to about 3 hours at a temperature of about 200 to about 400° C. When the dry temperature and time are within the above ranges, quinoline or carbonyl functional groups may be formed on a surface of the CNT by decomposition of the oxygen-containing organic acid.

The preparing of the second mixture may include mixing the oxygen functionalized CNT and a carbon precursor solution including the heterogeneous element by incipient wetness impregnation and then drying the mixture. For example, the preparing of the second mixture may be performed by mixing the oxygen functionalized CNT and the solution of the carbon precursor including the heterogeneous element to prepare a slurry, putting the slurry in a container such as a plastic pouch bag, and then repeatedly rubbing down the container with the hands, tools or the like.

The solution of the carbon precursor including the heterogeneous element may include water or an organic solvent (for example, pyridine).

In addition, the solution of the carbon precursor including the heterogeneous element may include acid (e.g., hydrochloric acid) or base (e.g., aqueous ammonia). Thus, the pH of the solution of the carbon precursor including the heterogeneous element may be, but is not limited to, from about 7 to about 14. When the pH of the solution of the carbon precursor including the heterogeneous element is within the above range, the solubility of the carbon precursor with respect to water or an organic solvent may be increased, thereby increasing processability.

The carbon precursor including the heterogeneous element may include a substituted or unsubstituted aromatic cyclic compound and/or a substituted or unsubstituted aromatic heterocyclic compound. The aromatic cyclic compound includes an aromatic ring including carbon atoms only, but not a heteroatom. The aromatic cyclic compound and/or the aromatic heterocyclic compound may each include an aromatic ring and/or a aromatic hetero ring substituted with a substituent. The substituent may be any substituent that is available in the art without limitation as long as the substituent includes the heterogeneous element. An example of the substituent may be sulfonic acid.

For example, the carbon precursor including the heterogeneous element may include at least one carbon compound selected from the group consisting of quinoxaline, hemin, p-toluene sulfonic acid, porphyrin, cobalt-tetramethoxy-phenylporphyrin, iron-tetramethoxy-phenylporphyrin, phthalocyanine, cobalt-phthalocyanine, iron-phthalocyanine, pyrazine, bipyridine, and a mixture thereof.

For example, the sintering of the second mixture may be performed for about 1 hour to about 72 hours under an inert atmosphere at a temperature of about 400° C. to about 1000° C. The inert atmosphere may be, but is not limited to, a nitrogen atmosphere, an argon atmosphere, a helium atmosphere, or the like, and may be any atmosphere without an active gas such as oxygen. The sintering of the second mixture may be performed in a vacuum. The temperature and time for the sintering are not limited to the above-described ranges and may be appropriately determined to completely carbonize the carbon precursor and to increase a specific surface area of the porous carbonaceous composite material.

The preparing method may further include refining a sintered material obtained by the sintering. The refining is an operation of removing impurities that remain in the sintered material. The impurities are components causing a side reaction in a lithium air battery.

For example, the refining includes immersing the sintered material in a solvent such as an aqueous hydrofluoric acid (HF) solution, an aqueous hydrochloric acid (HCl) solution, an aqueous nitric acid ($HNO_3$) solution, an aqueous hydrogen peroxide ($H_2O_2$) solution, an aqueous sulfuric acid solution, or a mixture including at least two of the foregoing for about 0.5 hours to about 24 hours. The concentration of the solvent and the immersion time in the solvent are not particularly limited and may be appropriately adjusted to remove the impurities and to increase the specific surface area of the porous carbonaceous composite material.

Hereinafter, one or more embodiments of the present invention will be described in detail with reference to the following examples. However, these examples are not intended to limit the purpose and scope of the one or more embodiments of the present invention.

EXAMPLE 1

(Preparation of Oxygen Functionalized CNT)

1.0 g of a multi-walled CNT (Xin nanomaterials, Taiwan) and 1.0 g of citric acid monohydrate were mixed in 5 mL of acetone to prepare a first slurry. The first slurry was put in a plastic pouch bag and was mixed by incipient wetness impregnation for 20 minutes. Then, the first slurry was dried for about 12 hours at room temperature (25° C.) and was further dried for one hour at a temperature of 250° C. During this process, citric acid decomposed, resulting in an oxygen functionalized CNT.

(Preparation of Oxygen Functionalized N-Doped Porous Carbonaceous Composite Material)

0.66 g of the oxygen functionalized CNT was added to 1.88 g of an aqueous hemin solution (which is obtained by dissolving 0.3 g of hemin in 2 mL of water) and a small amount of ammonia was further added thereto to prepare a second slurry with a pH of 12. Then, the second slurry was put in a plastic pouch bag and was mixed by incipient wetness impregnation for 20 minutes to obtain a homogeneous mixture. Then, the mixture was dried for 12 hours at a temperature of 25° C. to obtain a dried material. Then, the dried material was sintered for 3 hours under a nitrogen atmosphere at 850° C. to obtain a sintered material. The sintered material was immersed in 50 wt % of HF aqueous solution for 4 hours at 25° C. to remove impurities and was filtered and washed three times. The washed sintered material was freeze dried to obtain an oxygen functionalized N-doped porous carbonaceous composite material powder.

(Preparation of Positive Electrode)

90 parts by weight of the prepared oxygen functionalized porous carbonaceous composite material powder and 10 parts by weight of polyvinylidene fluoride (PVdF) were dissolved in an N-methylpyrrolidone (NMP) and mixed for 15 minutes to prepare a positive electrode slurry. The positive electrode slurry was coated on a gas diffusion layer (available from SGL, 35 BA), was dried for 2 hours at 60° C., and was dried for 2 hours in a vacuum at 120° C. to prepare a positive electrode.

The positive electrode was partially cut to have a circular shape with an area of 1 $cm^2$ and was used to prepare a battery.

(Preparation of Lithium Air Battery)

The prepared positive electrode, a lithium metal thin film as a negative electrode, and a stack structure of three sheets of CELGARD-3501 formed of polypropylene and available from CELGARD® as a separator were used. 45 µl of a 1 M LiTFSI electrolyte solution obtained by dissolving lithium bis(trifluoromethanesulfonyl)imide) (LiTFSI) in propylene carbonate were injected into the separator.

The lithium metal thin film as the negative electrode was mounted in a stainless case. The separator was disposed on the negative electrode. The prepared positive electrode was disposed on the separator. Then, a stainless steel mesh was disposed on the positive electrode, a pressing member that allows air to reach the positive electrode was disposed on the stainless steel mesh, and a pressure was applied to the pressing member to fix a cell, thereby completing manufacturing of a lithium air battery. The stainless case was divided into a lower portion that contacted the negative electrode and an upper electrode that contacted the positive electrode. An insulating resin was interposed between the upper and lower portions to electrically separate the positive electrode and the negative electrode from each other. An example of the lithium air battery is shown in FIG. 1.

COMPARATIVE EXAMPLE 1

(Use of Porous Carbonaceous Material)

A multi-walled CNT (Xin nanomaterials, Taiwan) was used as a porous carbonaceous material, instead of the oxygen functionalized N-doped porous carbonaceous composite material prepared in Example 1.

(Preparation of Positive Electrode)

A positive electrode was prepared in the same manner as in Example 1, except that a multi-walled CNT (Xin nanomaterials, Taiwan) was used as a porous carbonaceous material, instead of the oxygen functionalized N-doped porous carbonaceous composite material prepared in Example 1.

(Preparation of Lithium Air Battery)

A lithium air battery was prepared in the same manner as in Example 1, except that the positive electrode prepared in Comparative Example 1 was used instead of the positive electrode prepared in Example 1.

EVALUATION EXAMPLE

Evaluation Example 1

Evaluation of Porosity

BET specific surface areas and pore size distributions (4V/A by BET) of the porous carbonaceous composite material prepared in Example 1, the porous carbonaceous material used in Comparative Example 1, and the positive electrodes each prepared in Example 1 and Comparative Example 1 were measured by using a BET and a Barrett-Joyner-Halenda (BJT) method. Evaluation of micropores and external surface areas was performed by using a t-plot method. The evaluation results are shown in Table 1 below.

TABLE 1

|  |  | BET specific surface area [$m^2$/g] | Average pore size (4 V/A by BET) [nm] |
|---|---|---|---|
| Example 1 | porous carbonaceous composite material | 157.3 | 22.6 |
|  | Positive electrode | 95.3 | 26.1 |
| Comparative Example 1 | porous carbonaceous composite material | 269.2 | 16.6 |
|  | Positive electrode | 166.3 | 19.9 |

As shown in Table 1, the porous carbonaceous composite material prepared in Example 1 had a smaller BET specific surface area than the CNT of Comparative Example 1, but had a greater average pore size than the CNT of Comparative Example 1.

In addition, the positive electrode of Example 1 had a smaller BET specific surface than the positive electrode of Comparative Example 1, but had a greater average pore size than the CNT of Comparative Example 1.

Evaluation Example 2

Analysis of Surface Element of Porous Carbonaceous Composite Material (or Porous Carbonaceous Material)

Figure 2:
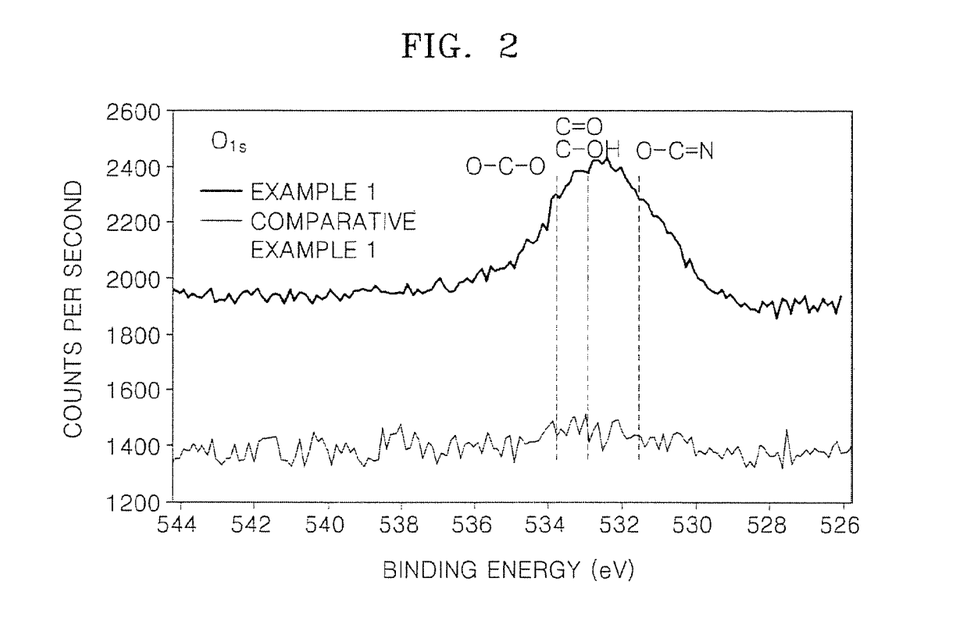
FIG. 2 is an X-ray photoelectron spectroscopy (XPS) spectrum image of the porous carbonaceous composite materials prepared in Example 1 and Comparative Example 1.

Surface elements of the porous carbonaceous composite material prepared in Example 1 and the porous carbonaceous material used in Comparative Example 1 were analyzed by X-ray photoelectron spectroscopy (XPS). The analysis results are shown in FIG. 2. In FIG. 2, the percentage of a peak area of oxygen with respect to a peak area of carbon in the XPS spectrum was calculated and was defined as the ratio of the number of surface oxygen atoms to the number of surface carbon atoms. The calculation results are shown in Table 2 below.

As shown in FIG. 2 and Table 2, the porous carbonaceous composite material prepared in Example 1 had a higher ratio of the number of surface oxygen atoms to the number of surface carbon atoms compared with the porous carbonaceous material of Comparative Example 1. In addition, it may be confirmed that surface oxygen was not physically attached in a molecular state (i.e., $O_2$) onto a surface of each of the materials, rather it was chemically attached onto the surface of each of the materials, and constituted a functional group (C—O—C, C=O, C—OH, O=C—N, O—C=O, or the like) together with other elements. If the surface oxygen is physically attached in a molecular state on the surface of each of the materials, an obvious peak necessarily appears at a binding energy around 535 eV in the XPS spectrum.

Evaluation Example 3

Evaluation of Charge/Discharge Characteristics

The lithium air batteries each prepared in Example 1 and Comparative Example 1 were discharged at a constant current of 0.2 mA/$cm^2$ at 25° C. and 1 atm to a voltage of 2.2 V (with respect to Li), charged at the same current (that is, the constant current) up to a voltage of 4.3 V, and charged at a constant voltage of 4.3 V until the total charging capacity reached the previous discharging capacity. This charging and discharging cycle was performed three times. In this case, the total charging capacity refers to the sum of a capacity obtained as a result of charging at a constant current and the capacity obtained as a result of charging at a constant voltage. Results of the charging and discharging experiment at the third cycle are shown in Table 2 and FIG. 3. The energy efficiency during charging and discharging was calculated according to Equation 1 below. The unit weight in the specific discharging capacity is the weight of the positive electrode including a porous carbonaceous composite material (or a porous carbonaceous material), a binder, and oxygen. Polarization refers to the difference between the average charging voltage and the average discharging voltage.

Energy efficiency[%]=$E$(discharging)/$E$(charging)×100

In Equation 1, E(charging) is the average voltage during charging and E(discharging) is the average voltage during discharging. The E(charging) and the E(discharging) were calculated by integrating the charging curve and the discharging curve on an electric capacity (x axis)–voltage(y axis) graph to obtain integrated values and then dividing the integrated value by the maximum discharging capacity and the maximum charging capacity, respectively.

TABLE 2

|  | Surface oxygen/ Surface carbon ratio [atom %] | Specific discharging capacity [mAh/g] | Polarization [V] | Energy Efficiency [%] |
|---|---|---|---|---|
| Example 1 | 2.45 | 404.1 | 1.425 | 63.4 |
| Comparative Example 1 | 0.1 | 268.8 | 1.752 | 56.6 |

Figure 3:
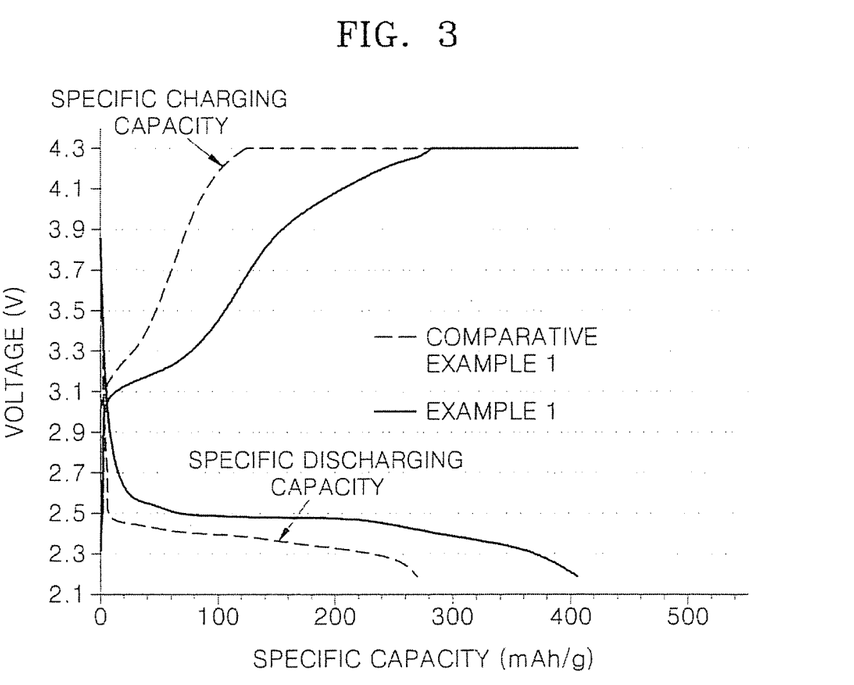
FIG. 3 is a graph of a the third charging and discharging cycles of the lithium air batteries prepared in Example 1 and Comparative Example 1.

As shown in Table 2 and FIG. 3, the lithium air battery prepared in Example 1 had an increased specific discharging capacity, reduced polarization, and substantially increased energy efficiency compared to the lithium air battery prepared in Comparative Example 1 in spite of a low BET specific surface area. The specific discharging capacity was increased, the polarization was reduced, and the energy efficiency was increased due to the increased ratio of the number of surface oxygen atoms/the number of surface carbon atoms and the increased average pore size.

As described above, according to the one or more of the above embodiments of the present invention, by using a porous carbonaceous composite material, a lithium air battery may have improved energy efficiency and a reduced polarization.

It should be understood that the exemplary embodiments described herein should be considered in a descriptive sense only and not for purposes of limitation. Descriptions of features or aspects within each embodiment should typically be considered as available for other similar features or aspects in other embodiments.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A porous carbonaceous composite material comprising:
    an oxygen functionalized carbon nanotube (CNT); and
    a modified carbonaceous material doped with a heterogeneous element, wherein the ratio of the number of surface oxygen atoms to the number of surface carbon atoms ranges from about 2 to about 15 atom % for the porous carbonaceous composite material; and
    wherein the porous carbonaceous composite material comprises a core including the oxygen functionalized CNT, and a coating layer disposed to cover at least a portion of the core, and wherein the coating layer comprises the modified carbonaceous material doped with the heterogeneous element;
wherein the average pore size of the porous carbonaceous composite material as a value measured by the Brunauer-Emmett-Teller(BET) method ranges from about 22.6 nm to about 200 nm.

2. The porous carbonaceous composite material of claim 1, wherein the core comprises a plurality of oxygen functionalized CNTs and pores existing between the plurality of oxygen functionalized CNTs.

3. The porous carbonaceous composite material of claim 1, wherein the modified carbonaceous material comprises one or a mixture of a carbon nanoparticle, mesoporous carbon, a CNT, a carbon nanofiber, a carbon nanosheet, a carbon nanorod, and a carbon nanobelt.

4. The porous carbonaceous composite material of claim 3, wherein the average diameter of the carbon nanoparticle is about 2 nm to about 900 nm.

5. The porous carbonaceous composite material of claim 1, wherein the heterogeneous element comprises at least one element from Groups 13 to 16 elements of the periodic table.

6. The porous carbonaceous composite material of claim 5, wherein the heterogeneous element comprises one or a mixture of nitrogen (N), sulfur (S), phosphorus (P), selenium (Se), tellurium (Te), and boron (B).

7. The porous carbonaceous composite material of claim 1, wherein the ratio of the number of the heterogeneous elements doped into the coating layer to the total number of atoms contained in the coating layer is about 30 atom % or less.

8. The porous carbonaceous composite material of claim 1, wherein the oxygen functionalized CNT is at least one of a single-walled oxygen functionalized CNT, a double-walled oxygen functionalized CNT, and a multi-walled oxygen functionalized CNT.

9. The porous carbonaceous composite material of claim 1, wherein the oxygen functionalized CNT is one or both of a semiconducting oxygen functionalized CNT and a metallic oxygen functionalized CNT.

10. The porous carbonaceous composite material of claim 1, wherein the specific surface area of the porous carbonaceous composite material as a value measured by using a BET method ranges from about 100 $m^2/g$ to about 900 $m^2/g$.

11. A positive electrode comprising:
    the porous carbonaceous composite material of claim 1; and
    a binder,
    wherein oxygen is used as a positive active material.

12. The positive electrode of claim 11, wherein the average pore size of the positive electrode as a value measured by using the Brunauer-Emmett-Teller (BET) method ranges from about 10nm to about 200 nm.

13. The positive electrode of claim 11, wherein the specific surface area of the positive electrode as a value measured by using the BET method ranges from about 30 $m^2/g$ to about 900 $M^2/g$.

14. The positive electrode of claim 13, further comprising a catalyst for facilitating oxidation and reduction of oxygen.

15. The positive electrode of claim 14, wherein the catalyst is at least of a metal particle, a metal oxide particle, and an organometallic compound.

16. The positive electrode of claim 15, wherein the metal particle is at least one of cobalt (Co), nickel (Ni), iron (Fe), gold (Au), silver (Ag), platinum (Pt), ruthenium (Ru), rhodium (Rh), osmium (Os), iridium (Ir), palladium (Pd), copper (Cu), manganese (Mn), titanium (Ti), vanadium (V), tungsten (W), molybdenum (Mo), and niobium (Nb), and an alloy including at least two of the foregoing.

17. The positive electrode of claim 15, wherein the metal oxide particle comprises manganese oxide, cobalt oxide, iron oxide, zinc oxide, nickel oxide, vanadium oxide, molybdenum oxide, niobium oxide, titanium oxide, tungsten oxide, chromium oxide, and a composite oxide including at least two of the foregoing.

18. A lithium air battery comprising:
    a negative electrode capable of intercalating and deintercalating lithium;
    the positive electrode of claim 11; and
    an electrolyte filled between the negative electrode and the positive electrode.

19. A method of preparing the porous carbonaceous composite material of claim 1, the method comprising:
    preparing a first mixture by mixing a carbon nanotube (CNT), oxygen-containing organic acid, and an organic solvent;
    preparing an oxygen functionalized CNT by drying the first mixture;
    preparing a second mixture by mixing the oxygen functionalized CNT and a carbon precursor including a heterogeneous element; and
    sintering the second mixture.

20. The method of claim 19, wherein the oxygen-containing organic acid is at least one organic acid or salt of citric acid, acetic acid, oxalic acid, gluconic acid, ethylenediamine tetra acetic acid (EDTA), diethylenetriamine-N,N,N',N',N"-pentaacetic acid (DTPA), trimethylamine tricarboxylic acid (NTA), and alkali metal salts thereof.

21. The method of claim 19, wherein the preparing of the first mixture is performed by incipient wetness impregnation.

22. The method of claim 19, wherein the drying of the first mixture is performed for about 1 to about 3 hours at a temperature of about 200 to about 400 ° C.

23. The method of claim 19, wherein the preparing of the second mixture comprising mixing the oxygen functionalized CNT and a solution of a carbon precursor including the heterogeneous element by incipient wetness impregnation to obtain a mixture and then drying the mixture.

24. The method of claim 23, wherein the pH of the solution of the carbon precursor including the heterogeneous element ranges from about 7 to about 14.

25. The method of claim 19, wherein the carbon precursor including the heterogeneous element comprises at least one of a substituted or unsubstituted aromatic cyclic compound and a substituted or unsubstituted aromatic heterocyclic compound.

26. The method of claim 19, wherein the carbon precursor including the heterogeneous element is at least one compound of quinoxaline, hemin, p-toluene sulfonic acid, porphyrin, cobalt-tetramethoxy-phenylp orphyrin, iron-tetramethoxy-phenylp orphyrin, phthalocyanine, cobalt-phthalocyanine, iron-phthalocyanine, pyrazine, and bipyridine.

27. The method of claim 19, wherein the sintering of the second mixture is performed for about 1 hour to about 72 hours under an inert atmosphere at a temperature of about 400° C. to about 1000° C.

28. The method of claim 19, further comprising refining a sintered material obtained by the sintering after the sintering of the second mixture is performed.

29. The method of claim 28, wherein the refining of the sintered material comprises immersing the sintered material in an aqueous hydrofluoric acid (HF) solution, an aqueous hydrochloric acid (HCl) solution, an aqueous nitric acid ($HNO_3$) solution, an aqueous hydrogen peroxide ($H_2O_2$) solution, an aqueous sulfuric acid solution, or a mixture including at least two of the foregoing.

* * * * *